United States Patent
Anand et al.

(10) Patent No.: US 8,689,222 B2
(45) Date of Patent: Apr. 1, 2014

(54) CONTROLLING PRIORITY OF MULTI-THREADED HARDWARE RESOURCES BY SYSTEM CALLS

(75) Inventors: Vaijayanthimala K. Anand, Austin, TX (US); Joerg Droste, Beaverton, OR (US); Bruce Mealey, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 12/261,275

(22) Filed: Oct. 30, 2008

(65) Prior Publication Data

US 2010/0115522 A1     May 6, 2010

(51) Int. Cl.
*G06F 9/46*     (2006.01)

(52) U.S. Cl.
USPC .......................................... 718/103; 712/220

(58) Field of Classification Search
USPC ........................................................ 718/103
See application file for complete search history.

(56) References Cited

U.S. PATENT DOCUMENTS

| | | | |
|---|---|---|---|
| 6,301,602 B1 * | 10/2001 | Ueki | ............................. 718/103 |
| 6,658,447 B2 | 12/2003 | Cota-Robles | |
| 7,013,400 B2 | 3/2006 | Kalla et al. | |
| 7,360,062 B2 | 4/2008 | Kalla et al. | |
| 7,363,625 B2 | 4/2008 | Burky et al. | |
| 2005/0050541 A1 * | 3/2005 | Sun et al. | ....................... 718/100 |
| 2006/0195847 A1 * | 8/2006 | Amano et al. | ................. 718/103 |

OTHER PUBLICATIONS

Mackerras et al.; "Operating System Exploitation of the POWER5 System"; IBM J. Res. & Dev.; vol. 49 No. 4/5; Jul./Sep. 2005.*

* cited by examiner

*Primary Examiner* — Andrew Caldwell
*Assistant Examiner* — Benjamin Geib
(74) *Attorney, Agent, or Firm* — Yudell Isidore Ng Russell PLLC

(57) ABSTRACT

A method, a system and a computer program product for controlling the hardware priority of hardware threads in a data processing system. A Thread Priority Control (TPC) utility assigns a primary level and one or more secondary levels of hardware priority to a hardware thread. When a hardware thread initiates execution in the absence of a system call, the TPC utility enables execution based on the primary level. When the hardware thread initiates execution within a system call, the TPC utility dynamically adjusts execution from the primary level to the secondary level associated with the system call. The TPC utility adjusts hardware priority levels in order to: (a) raise the hardware priority of one hardware thread relative to another; (b) reduce energy consumed by the hardware thread; and (c) fulfill requirements of time critical hardware sections.

20 Claims, 4 Drawing Sheets

CONTROLLING PRIORITY OF MULTI-THREADED HARDWARE RESOURCES BY SYSTEM CALLS

BACKGROUND

1. Technical Field

The present invention generally relates to data processing systems and in particular to thread management in data processing systems.

2. Description of the Related Art

A growing number of microprocessor systems contain a feature called simultaneous multi-threading. This multi-threading feature allows a microprocessor core to execute two distinct instruction streams at the same time. Operating within a multi-threading environment is a set of important applications built on a model by which an individual application provides some level of multi-tasking. These applications usually have a dispatching mechanism which schedules tasks on central processing units (CPUs). In a way, these applications bypass typical UNIX/Linux (single threaded) process models to achieve some gains in efficiency. Two such application examples are Sybase Adaptive Server Enterprise (ASE) and Systems Applications Products (SAP).

These applications which operate in a multi-threading environment generally utilize non-blocking system calls. The applications employ non-blocking system calls, for example, poll( ) or select( ), as a way to determine the level of management required for incoming network traffic. These applications generally use a significant amount of processing for implementing poll( ) or select( ) system calls even when the system calls are partially loaded. However, the execution of these poll( ) select( ) system calls is generally unproductive, as repeated calls are utilizing CPU cycles that may be applied more efficiently.

SUMMARY OF ILLUSTRATIVE EMBODIMENTS

Disclosed are a method, a system and a computer program product for controlling the hardware priority of hardware threads in a data processing system. A Thread Priority Control (TPC) utility assigns a primary level and one or more secondary levels of hardware priority to a hardware thread. When a hardware thread initiates execution in the absence of a system call, the TPC utility enables execution based on the primary level. When the hardware thread initiates execution within a system call, the TPC utility dynamically adjusts execution from the primary level to the secondary level associated with the system call. The TPC utility adjusts hardware priority levels in order to: (a) raise the hardware priority of one hardware thread relative to another; (b) reduce energy consumed by the hardware thread; and (c) fulfill requirements of time critical hardware sections.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
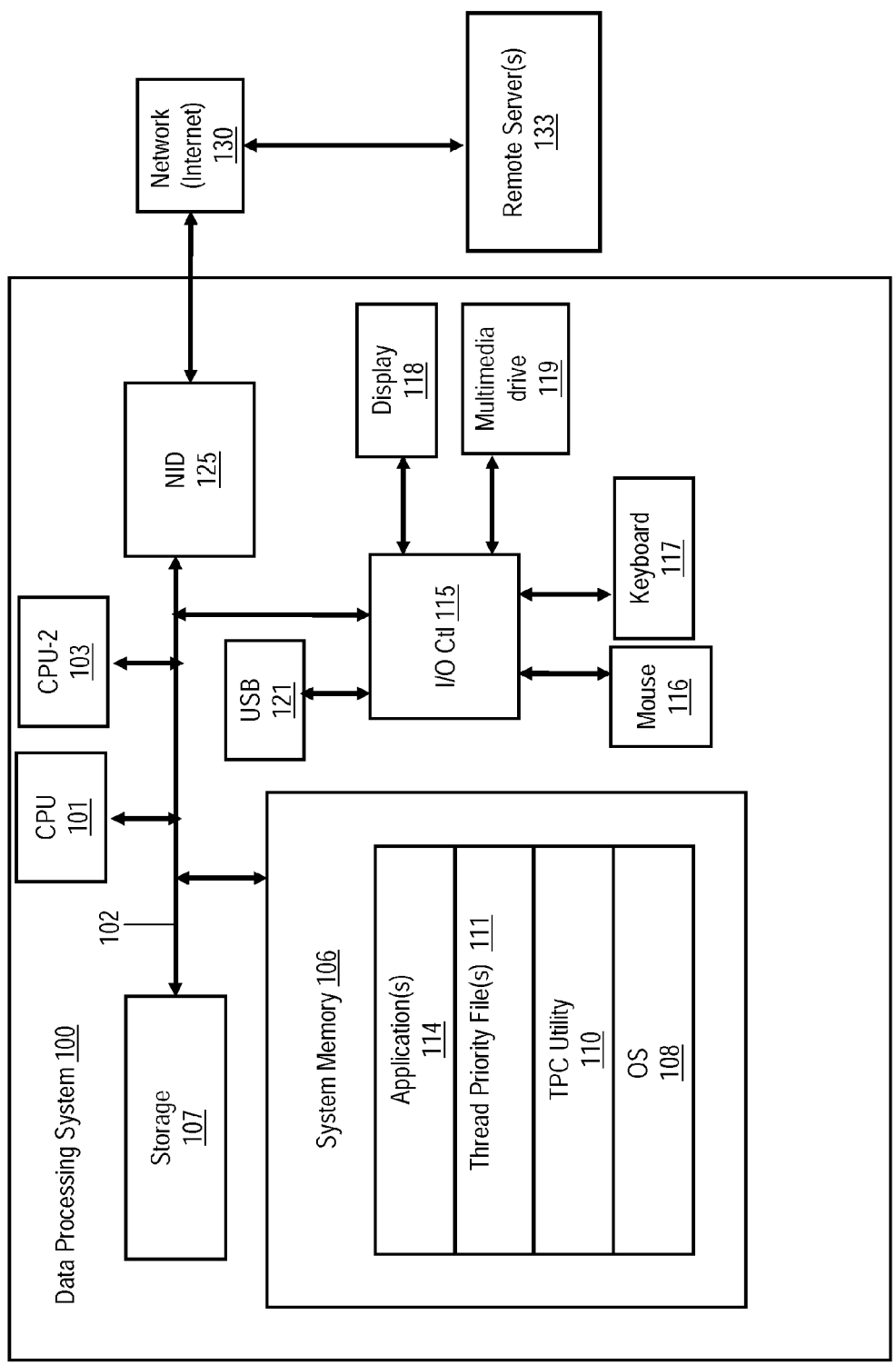
FIG. 1 provides a block diagram representation of a data processing system within which the invention may be practiced, according to one embodiment of the invention.

The illustrative embodiments provide a method, a system and a computer program product for controlling the hardware priority of hardware threads in a data processing system. A Thread Priority Control (TPC) utility assigns a primary level and one or more secondary levels of hardware priority to a hardware thread. When a hardware thread initiates execution in the absence of a system call, the TPC utility enables execution based on the primary level. When the hardware thread initiates execution within a system call, the TPC utility dynamically adjusts execution from the primary level to the secondary level associated with the system call. The TPC utility adjusts hardware priority levels in order to: (a) raise the hardware priority of one hardware thread relative to another; (b) reduce energy consumed by the hardware thread; and (c) fulfill requirements of time critical hardware sections.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the following terms are defined as follows: a "hardware thread" or "thread" pertains to the set of hardware resources that are allocated to an executing application.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) connected to system memory 106 via system interconnect/bus 102. In particular, CPU1 101 and CPU2 103 are illustrated. Also connected to system bus 102 is Input/output (I/O) controller 115, which provides connectivity and control for input devices, of which pointing device (or mouse) 116 and keyboard 117 are illustrated. I/O controller 120 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. DPS 100 also comprises storage 107, within/from which data/instructions/code may also be stored/retrieved.

DPS 100 is also illustrated with a network interface device (NID) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. ND 125 may be configured to communicate via wired /or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 133, which may also provide data/instructions/code for execution on DPS 100, in one embodiment.

In addition to the above described hardware components of DPS 100, various features of the invention are completed/supported via software (or firmware) code or logic stored within memory 106 or other storage (e.g., storage 107) and executed by CPU 101. Thus, for example, illustrated within memory 106 are a number of software/firmware/logic components, including operating system (OS) 108 (e.g., Microsoft Windows®, a trademark of Microsoft Corp, or GNU®/Linux®, registered trademarks of the Free Software Foundation and The Linux Mark Institute), applications 114, Thread Priority File(s) 111 and Thread Priority Control (TPC) utility 110 (which executes on CPU1 101 and CPU2 103). In actual implementation, TPC utility 110 may be combined with or incorporated within application 114 to provide a single executable component, collectively providing the various functions of each individual software component when the corresponding combined code is executed by the CPU 101. For simplicity, TPC utility 110 is illustrated and described as a stand alone or separate software/firmware component, which provides specific functions, as described below.

In one embodiment, servers 133 includes a software deploying server, and DPS 100 communicates with the software deploying server (133) via network (e.g., Internet 130) using network interface device 125. Then, the TPC utility 110 may be deployed from/on the network, via software deploying server 133. With this configuration, software deploying server performs all of the functions associated with the execution of TPC utility 110. Accordingly, DPS 100 is not required to utilize internal computing resources of DPS 100 to execute TPC utility 110.

CPU 101 executes TPC utility 110 as well as OS 108, which supports the user interface features of TPC utility 110. In the described embodiment, TPC utility 110 generates/provides several graphical user interfaces (GUI) to enable user interaction with, or manipulation of, the functional features of TPC utility 110. Certain functions supported and/or implemented by TPC utility generate processing logic executed by processor and/or device hardware to complete the implementation of that function. For simplicity of the description, the collective body of code that enables these various features is referred to herein as TPC utility 110. Among the software code/instructions/logic provided by TPC utility 110, and which are specific to the invention, are: (a) code/logic for assigning primary and secondary levels of hardware priority to a hardware thread; (b) code/logic for detecting an execution of one or more instruction streams; and (c) code/logic for dynamically adjusting thread operation from a primary priority level to a secondary priority level assigned for a service call. According to the illustrative embodiment, when CPU 101 executes TPC utility 110, DPS 100 initiates a series of functional processes that enable the above functional features as well as additional features/functionality. These features/functionality are described in greater detail below within the description of FIGS. 2-4.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer P5 or P6 system, a product of International Business Machines Corporation in Armonk, N.Y., running the Advanced Interactive Executive (AIX) operating system or LINUX operating system.

Figure 2:
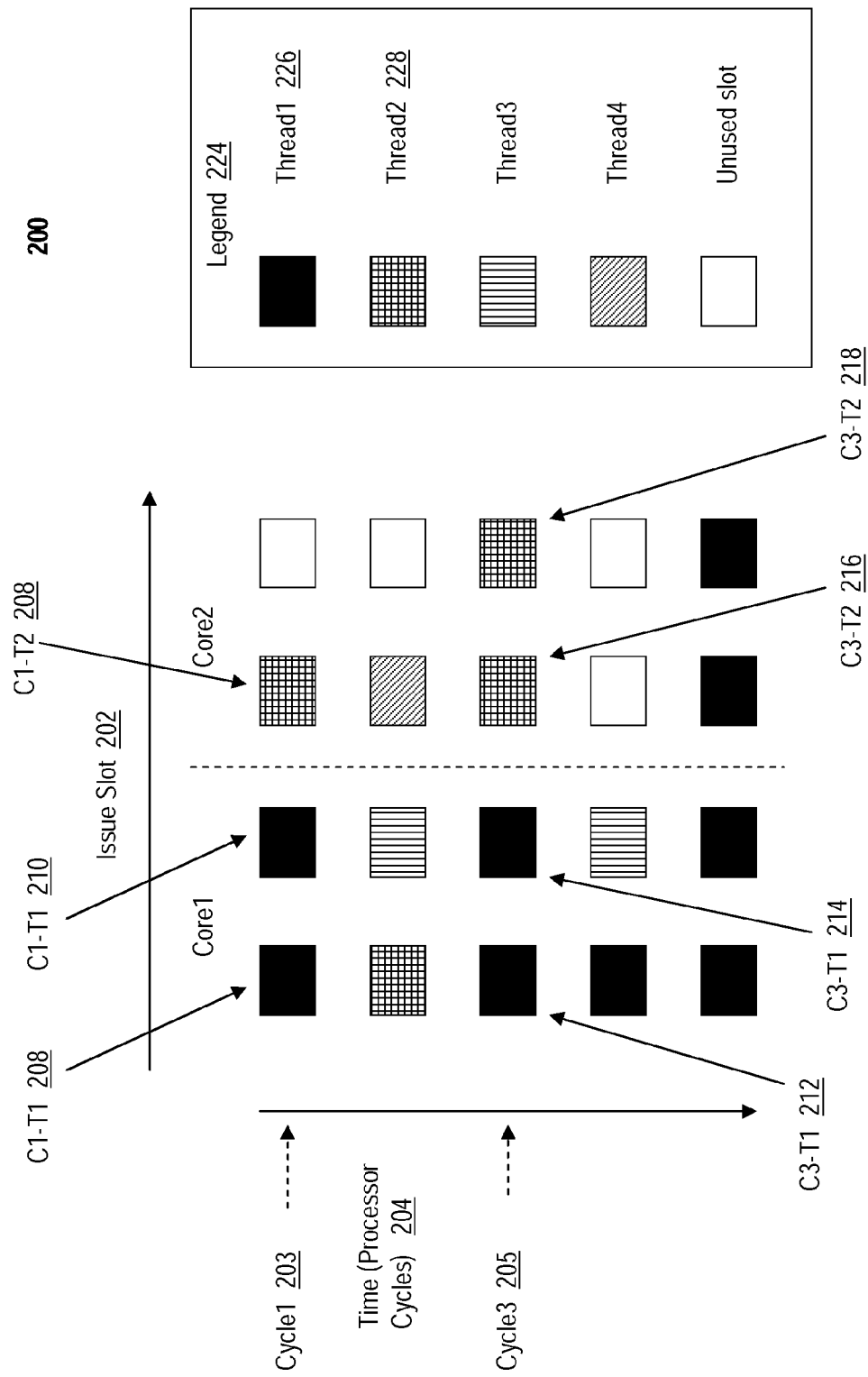
FIG. 2 is an example graphical illustration of simultaneous multi-threading, in accordance with one embodiment of the invention.

With reference now to FIG. 2, an example graphical illustration of simultaneous multi-threading is depicted, in accordance with one embodiment of the invention. Graph 200 comprises "issue slot" axis 202 and "time (processor cycles)" axis 204. Issue slot axis 202 demonstrates thread execution within two slot pairs, one pair from core1 101 and the other from core2 103. The relationship between processor cycles and issue slots (of instruction streams) are illustrated for a system capable of issuing four (4) instruction streams per processor cycle. Graph 200 further comprises legend 224. Graph 200 also comprises a set of data points within the first cycle (cycle-1 203) including first Cycle1-Thread1 (C1-T1) 208, second Cycle1-Thread1 (C1-T1) 210. First Cycle1-Thread1 (C1-T1) 208 represents one instruction stream executed by Thread1 226 during a first processor cycle (e.g., Cycle1 203). Second Cycle1-Thread1 (C1-T1) 210 represents another (i.e., a second) instruction stream executed by Thread1 226 during a first processor cycle (e.g., Cycle1 203). Additional data points illustrated (in the third cycle, cycle-3 205) are first Cycle3-Thread1 (C3-T1) 212, second Cycle3-Thread1 (C3-T1) 214, first Cycle3-Thread2 (C3-T2) 216 and second Cycle3-Thread2 (C3-T2) 218.

The IBM POWER5 and POWER6 microprocessors contain a feature called simultaneous multi-threading (SMT). The multi-threading feature allows a microprocessor core to execute two distinct instruction streams at the same time. Thus, in a IBM Power5 or Power6 device, a minimum of two processor cores are required to execute four (4) instruction streams per processor cycle. In SMT processing, multiple (sets/streams of) instructions are issued from multiple threads per cycle.

In graph 200, Thread1 226 executes two instruction streams on processor core1 101 within the first cycle (cycle-1 203), as illustrated by first Cycle1-Thread1 (C1-T1) 208 and second Cycle1-Thread1 (C1-T1) 210, respectively. In the third cycle (cycle-3 205), Thead1 226 executes two instruction streams on processor core1 101, as illustrated by first Cycle3-Thread1 (C1-T1) 212 and second Cycle3-Thread1 (C3-T1) 214, respectively. Thread2 228 executes two instruction streams on processor core2 103 within the third cycle (cycle-3 205), as illustrated by first Cycle3-Thread2 (C3-T2) 216 and second Cycle3-Thread2 (C3-T2) 218, respectively.

On the POWER5 and POWER6, each hardware thread in a core operates at a "hardware priority". TPC utility 110 utilizes the hardware priority to control the rate of instructions executed by one thread with respect to another thread when one thread is idle.

TPC utility 110 assigns both primary and secondary levels of priority which are recorded in one or more priority files 111 (FIG. 1). The primary level of priority is applicable to a hardware thread running when neither a service call nor other hardware thread is executing. The secondary level(s) of priority is utilized when the hardware thread executes within a system call or when another hardware thread is executing. The secondary priority levels may be set based on one or more of: (a) priority of other hardware threads; (b) a type of system call; (c) system conditions coincident with an initiation of a system call; and (d) system conditions coincident with an initiation of a particular type of system call. TPC utility 110 may globally set the secondary (priority) level(s) for a set of processes in the system TPC utility 110 may also locally set the secondary (priority) level for a subset of processes in the system. Furthermore, TPC utility 110 may raise the priority of one thread having a time critical allocation of hardware resources relative to the priority level of another thread. Hardware priority may also be used to reduce energy consumed by a thread in the core. For example, a lower hardware priority reduces the rate at which CPU cycles are utilized. Consequently, less energy is consumed by a lower priority thread than a higher priority thread in a processor core.

Figure 3:
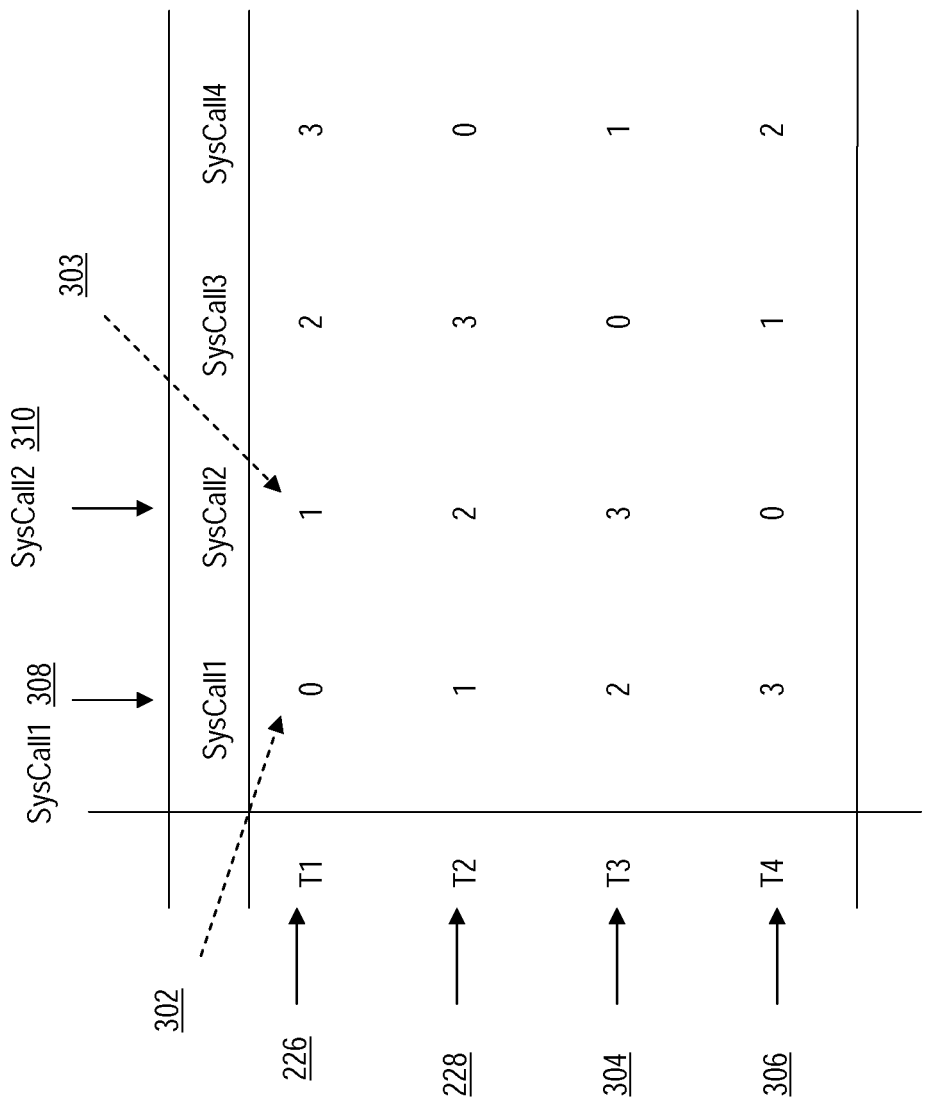
FIG. 3 is an example table representation of a file containing assigned priority levels of hardware threads, according to one embodiment of the invention.

FIG. 3 is an example table representation of a file containing assigned priority levels of hardware threads, according to one embodiment of the invention. File 111 depicts (secondary) priority levels respectively assigned to four hardware threads, T1 226, T2 228, T3 304 and T4 306, while each thread runs in each one of four system calls of which Syscall1 308 and Syscall2 310 are highlighted.

TPC utility 110 may increase or decrease the priority of a hardware thread while the hardware thread is running in a system call, based on assigned priorities recorded in priorities file 111. Specifically, TPC utility 110 allows the hardware priority to be managed on a system call by system call basis. For example, TPC utility 110 may respectively assign different hardware priority levels with respect to the poll( ) system call (which may be represented by Syscall 1 308) and the read( ) system call (which may be represented by Syscall2 310). In particular, T1 226 is assigned a highest priority level "0" 302 while running in Syscall 1 308. However, T1 226 is assigned a lower priority level "1" 303 while running in Syscall2 310. TPC utility 110 may globally set hardware priorities for system calls for all processes in the system based on one or more of: (a) priority of other hardware threads; (b) a type of system call; (c) system conditions coincident with an initiation of a system call; and (d) system conditions coincident with an initiation of a particular type of system call.

By controlling the hardware priority when executing system calls external to an application, TPC utility 110 reduces the performance impacts of these system calls against other threads in the system and improves overall system energy usage. For example, a lower hardware priority assigned to a first thread in which a system call is running reduces the rate at which CPU cycles are utilized by the first thread. Thus, more resources are available for a second thread (executing in the absence of a system call) which is assigned a higher priority. Consequently, less energy is consumed by the lower priority thread than the higher priority thread.

Figure 4:
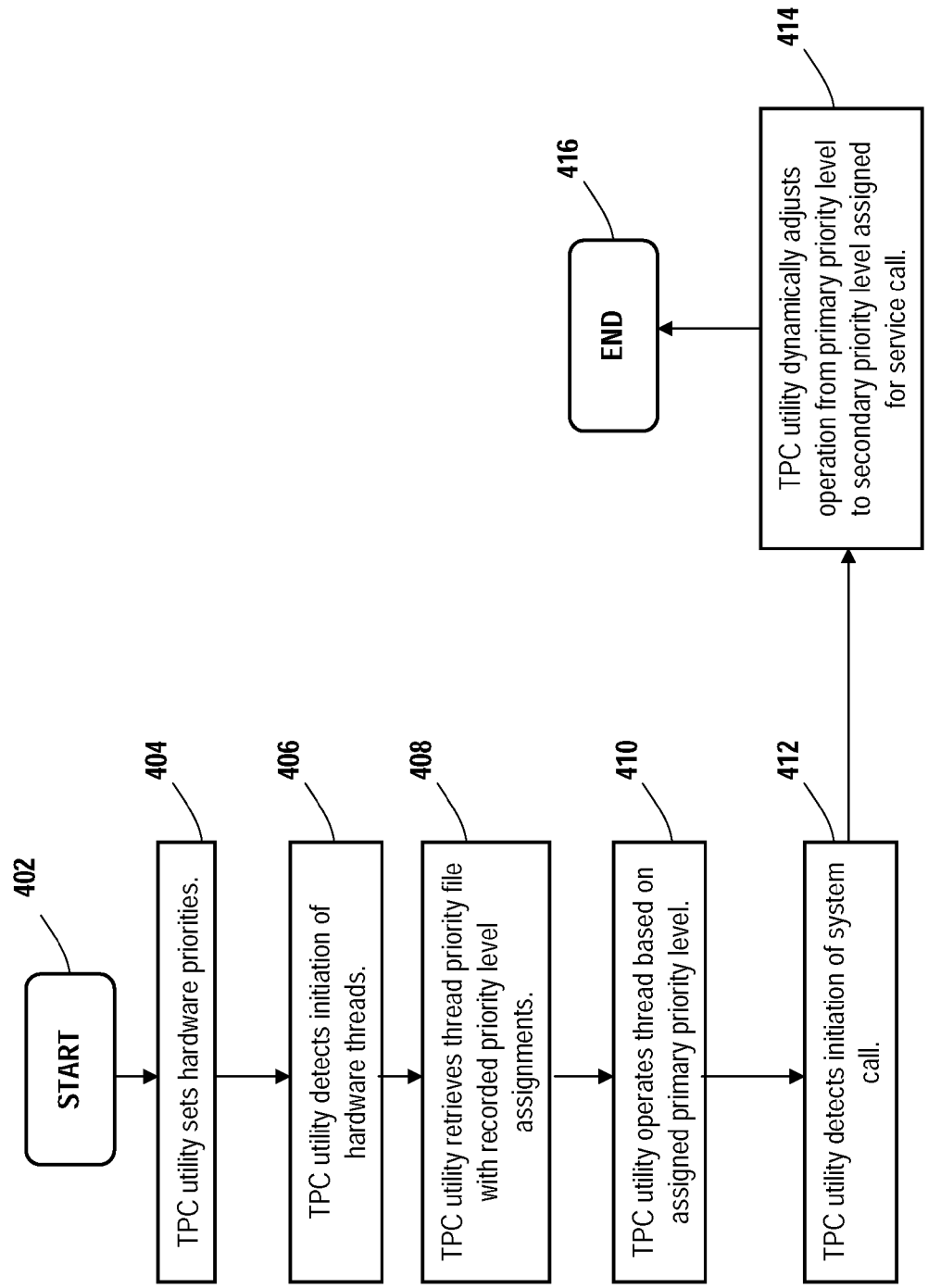
FIG. 4 is a flow chart illustrating the process of setting hardware priorities and controlling hardware thread operation by dynamically adjusting hardware priority levels, according to one embodiment of the invention.

FIG. 4 is a flow chart illustrating the method by which the above processes of the illustrative embodiments are completed. Although the method illustrated in FIG. 4 may be described with reference to components shown in FIGS. 1-3, it should be understood that this is merely for convenience and alternative components and/or configurations thereof can be employed when implementing the various methods. Key portions of the method may be completed by TPC utility 110 executing on processor 101 within DPS 100 (FIG. 1) and controlling specific operations of/on DPS 100. The method is thus described from the perspective of either/both TPC utility 110 and DPS 100.

The process of FIG. 4 begins at initiator block 402 and proceeds to block 404, at which TPC utility sets hardware priorities for a set of hardware threads (e.g., T1 226 and T2 228 (FIGS. 2-3) in DPS 100. TPC utility 110 assigns multiple levels of priority (e.g., primary and secondary priority levels) which are recorded in one or more priority files (e.g., thread priority file 111). For example, TPC utility 110 assigns the primary level of priority to a hardware thread running in the absence of a service call (or other hardware thread), via by thread priority file 111. However, TPC utility 110 assigns the secondary priority level via thread priority file 111 when the hardware thread executes within a system call. Furthermore, TPC utility 110 may increase or decrease the priority of a hardware thread while the hardware thread is running in a system call, based on assigned priorities recorded in priorities file 111. At block 406, TPC utility 110 detects initiation of one or more hardware threads. At block 408, TPC utility 110 retrieves thread priority file 111 which contains a set of assigned priority levels. TPC utility 110 operates thread(s) based on primary priority level (for example) via the assignment retrieved from thread priority file 111, as shown at block 410. At block 412, TPC utility 110 detects initiation of a system call. At block 414, TPC utility 110 dynamically adjusts thread operation from the primary priority level to the secondary hardware priority level (for example) assigned (via thread priority file 111) for service calls. In one embodiment, TPC utility 110 may suspend thread operation based on the secondary priority level. By controlling the hardware priority when executing system calls external to an application, TPC utility 110 reduces the performance impacts of these system calls against other threads in the system and improves overall system energy usage. The process ends at block 416.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method comprising:
   assigning, to a hardware thread associated with one or more instruction streams, a primary level of hardware priority and one or more secondary levels of hardware priority, wherein the hardware thread is a set of hardware resources allocated to an application, and wherein the primary level of hardware priority and the one or more secondary levels of hardware priority are recorded within a plurality of thread priority files, wherein the hardware thread is one of a plurality of hardware threads in a simultaneous multi-threading (SMT) processor;
   detecting an initiation of the hardware thread;
   in response to detecting initiation of the hardware thread:
      retrieving the plurality of thread priority files; and
      determining whether a system call is initiated; and
   controlling operation of the hardware thread based on the primary level of hardware priority and the one or more secondary levels of hardware priority established by the plurality of thread priority files.

2. The method of claim 1, wherein the assigning further comprises:
   creating the plurality of thread priority files, wherein the plurality of thread priority files map the hardware thread to the primary level of hardware priority and the one or more secondary levels of hardware priority;
   in response to detecting execution of the hardware thread, assigning the primary level of hardware priority to the hardware thread at a time when neither of a system call and another hardware thread is executing;
   utilizing one or more secondary levels of hardware priority while system calls or other threads are initiated, wherein the one or more secondary levels of hardware priority are based on one or more of:
      priority of other hardware threads;
      a type of system call;
      system conditions coincident with an initiation of a system call; and
      system conditions coincident with an initiation of a particular type of system call;
      wherein the one or more secondary levels of hardware priority with respect to system calls are set globally for a set of processes in the system or locally for a subset of the set of processes in the system; and
   storing the plurality of thread priority files.

3. The method of claim 1, wherein the controlling further comprises:
   in response to detecting the hardware thread initiating execution without the system call, executing the hardware thread based on the primary level of hardware priority; and
   in response to detecting the hardware thread executing within the system call, dynamically adjusting operation of the hardware thread from the primary level of hardware priority to at least one of the one or more secondary levels of hardware priority based on one or more stored hardware priorities corresponding to system calls.

4. The method of claim 1, further comprising:
dynamically adjusting the hardware priority of the hardware thread in response to one or more of:
execution of one or more threads having different operation requirements;
a level of energy consumed by the hardware thread;
one or more priority requirements of a time critical allocation of hardware resources of the hardware thread; and
one or more priority requirements of a system call.

5. The method of claim 1, wherein:
the one or more secondary levels of hardware priority assigned to the hardware thread are assigned with respect to one of a poll system call or a read system call; and
the hardware resources include CPU cycles.

6. The method of claim 1, further comprising:
in response to the hardware thread being in an idle state, controlling a rate of instructions executed by the hardware thread with respect to another thread.

7. The method of claim 1, further comprising:
in response to dynamically adjusting operation of the hardware thread from the primary level of hardware priority to the one or more secondary levels of hardware priority, suspending operation of the hardware thread based on the one or more secondary levels of hardware priority.

8. A data processing system comprising:
a plurality of simultaneous multi-threading (SMT) processors;
a memory system coupled to the plurality of processors;
a utility that when executed on one or more of the plurality of SMT processors provides processing logic that:
assigns, to a hardware thread associated with one or more instruction streams, a primary level of hardware priority and one or more secondary levels of hardware priority, wherein the hardware thread is a set of hardware resources allocated to an application, and wherein the primary level of hardware priority and the one or more secondary levels of hardware priority are recorded within a plurality of thread priority files, wherein the hardware thread is one of a plurality of hardware threads in a simultaneous multi-threading (SMT) processor;
detects an initiation of the hardware thread;
in response to detecting initiation of the hardware thread:
retrieves the plurality of thread priority files; and
determines whether a system call is initiated; and
controls operation of the hardware thread based on the primary level of hardware priority and the one or more secondary levels of hardware priority established by the plurality of thread priority files.

9. The data processing system of claim 8, wherein the processing logic for assigning further comprises processing logic that:
creates the plurality of thread priority files, wherein the plurality of thread priority files map the hardware thread to the primary level of hardware priority and the one or more secondary levels of hardware priority;
in response to detecting execution of the hardware thread, assigns the primary level of hardware priority to the hardware thread at a time when neither of a system call and another hardware thread is executing;
utilizes one or more secondary levels of hardware priority while system calls or other threads are initiated, wherein the one or more secondary levels of hardware priority are based on one or more of:
priority of other hardware threads;
a type of system call;
system conditions coincident with an initiation of a system call; and
system conditions coincident with an initiation of a particular type of system call;
wherein the one or more secondary levels of hardware priority with respect to system calls are set globally for a set of processes in the system or locally for a subset of the set of processes in the system; and
stores the plurality of thread priority files.

10. The data processing system of claim 8, wherein the processing logic for controlling further comprises processing logic that:
in response detecting to the hardware thread initiating execution without the system call, executes the hardware thread based on the primary level of hardware priority; and
in response to detecting the hardware thread executing within the system call, dynamically adjusts operation of the hardware thread from the primary level of hardware priority to at least one of the one or more secondary levels of hardware priority based on one or more stored hardware priorities corresponding to system calls.

11. The data processing system of claim 8, the utility further providing processing logic that:
dynamically adjusts the hardware priority of the hardware thread in response to one or more of:
execution of one or more threads having different operation requirements;
a level of energy consumed by the hardware thread;
one or more priority requirements of a time critical allocation of hardware resources of the hardware thread; and
one or more priority requirements of a system call.

12. The data processing system of claim 8, wherein:
the one or more secondary levels of hardware priority assigned to the hardware thread are assigned with respect to one of a poll system call or a read system call; and
the hardware resources include CPU cycles.

13. The data processing system of claim 8, wherein the processing logic further comprises processing logic that:
in response to the hardware thread being in an idle state, controls a rate of instructions executed by the hardware thread with respect to another thread.

14. The data processing system of claim 8, wherein the processing logic further comprises processing logic that:
in response to dynamically adjusting operation of the hardware thread from the primary level of hardware priority to the one or more secondary levels of hardware priority, suspends operation of the hardware thread based on the one or more secondary levels of hardware priority.

15. A computer program product comprising:
a non-transitory computer readable device; and
program code on the non-transitory computer readable device that when executed within a data processing device, the program code provides the functionality of:
assigning, to a hardware thread associated with one or more instruction streams, a primary level of hardware priority and one or more secondary levels of hardware priority, wherein the hardware thread is a set of hardware resources allocated to an application, and wherein the primary level of hardware priority and the one or more secondary levels of hardware priority are recorded within a plurality of thread priority files, wherein the hardware thread is one of a plurality of hardware threads in a simultaneous multi-threading (SMT) processor;

detecting an initiation of the hardware thread;

in response to detecting initiation of the hardware thread:
- retrieving the plurality of thread priority files; and
- determining whether a system call is initiated; and controlling operation of the hardware thread based on the primary level of hardware priority and the one or more secondary levels of hardware priority established by the plurality of thread priority files.

16. The computer program product of claim 15, wherein the program code for assigning further comprises program code for:

creating the plurality of thread priority files, wherein the plurality of thread priority files map the hardware thread to the primary level of hardware priority and the one or more secondary levels of hardware priority;

in response to detecting execution of the hardware thread, assigning the primary level of hardware priority to the hardware thread at a time when neither of a system call and another hardware thread is executing;

utilizing one or more secondary levels of hardware priority while system calls or other threads are initiated, wherein the one or more secondary levels of hardware priority are based on one or more of:
- priority of other hardware threads;
- a type of system call;
- system conditions coincident with an initiation of a system call; and
- system conditions coincident with an initiation of a particular type of system call;

wherein the one or more secondary levels of hardware priority with respect to system calls are set globally for a set of processes in the system or locally for a subset of the set of processes in the system; and storing the plurality of thread priority files.

17. The computer program product of claim 15, wherein the program code for controlling further comprises program code for:

in response to detecting the hardware thread initiating execution without the system call, executing the hardware thread based on the primary level of hardware priority; and in response to detecting the hardware thread executing within the system call, dynamically adjusting operation of the hardware thread from the primary level of hardware priority to at least one of the one or more secondary levels of hardware priority based on one or more stored hardware priorities corresponding to system calls.

18. The computer program product of claim 15, further comprising program code for:

dynamically adjusting the hardware priority of the hardware thread in response to one or more of:
- execution of one or more threads having different operation requirements;
- a level of energy consumed by the hardware thread;
- one or more priority requirements of a time critical allocation of hardware resources of the hardware thread; and
- one or more priority requirements of a system call.

19. The computer program product of claim 15, further comprising program code for:

in response to the hardware thread being in an idle state, controlling a rate of instructions executed by the hardware thread with respect to another thread.

20. The computer program product of claim 15, further comprising program code for:

in response to dynamically adjusting operation of the hardware thread from the primary level of hardware priority to the one or more secondary levels of hardware priority, suspending operation of the hardware thread based on the one or more secondary levels of hardware priority;

the one or more secondary levels of hardware priority assigned to the hardware thread are assigned with respect to one of a poll system call or a read system call; and wherein the hardware resources include CPU cycles.

* * * * *